(12) United States Patent
Okamoto et al.

(10) Patent No.: US 9,991,519 B2
(45) Date of Patent: Jun. 5, 2018

(54) ELECTROLYTIC ALUMINUM FOIL, PRODUCTION METHOD THEREFOR, CURRENT COLLECTOR FOR ELECTRICAL STORAGE DEVICE, ELECTRODE FOR ELECTRICAL STORAGE DEVICE, AND ELECTRICAL STORAGE DEVICE

(71) Applicant: Hitachi Metals, Ltd., Tokyo (JP)

(72) Inventors: Atsushi Okamoto, Mishima-gun (JP); Junichi Matsuda, Mishima-gun (JP)

(73) Assignee: HITACHI METALS, LTD., Tokyo (JP)

( * ) Notice: Subject to any disclaimer, the term of this patent is extended or adjusted under 35 U.S.C. 154(b) by 0 days. days.

(21) Appl. No.: 14/917,807

(22) PCT Filed: Feb. 19, 2015

(86) PCT No.: PCT/JP2015/054696
§ 371 (c)(1),
(2) Date: Mar. 9, 2016

(87) PCT Pub. No.: WO2015/125900
PCT Pub. Date: Aug. 27, 2015

(65) Prior Publication Data
US 2016/0233514 A1  Aug. 11, 2016

(30) Foreign Application Priority Data

Feb. 20, 2014 (JP) .................................. 2014-031068

(51) Int. Cl.
*H01M 4/66* (2006.01)
*C25D 1/04* (2006.01)
(Continued)

(52) U.S. Cl.
CPC .............. *H01M 4/661* (2013.01); *C25D 1/04* (2013.01); *C25D 3/44* (2013.01); *H01G 11/68* (2013.01);
(Continued)

(58) Field of Classification Search
CPC .. H01M 4/661; H01M 10/0525; H01G 11/70; H01G 11/84; H01G 11/86; H01G 11/68; C25D 1/04; C25D 3/44
See application file for complete search history.

(56) References Cited

U.S. PATENT DOCUMENTS

2008/0176144 A1* 7/2008 Iwama .................. H01M 4/134
429/338
2012/0292191 A1 11/2012 Goto et al.
(Continued)

FOREIGN PATENT DOCUMENTS

CN  102122576 A  7/2011
EP  2 639 341 A1  9/2013
(Continued)

OTHER PUBLICATIONS

Extended European search report issued by the European Patent Office in European Patent Application No. 15751513.1 dated Sep. 28, 2017 (9 pages).
(Continued)

*Primary Examiner* — Stewart A Fraser
(74) *Attorney, Agent, or Firm* — Kratz, Quintos & Hanson, LLP

(57) ABSTRACT

An object of the present invention is to provide an electrolytic aluminum foil having no significant difference in properties between one surface and the other surface thereof, and also a method for producing the same. Another object is to provide a current collector for an electrical storage device using the electrolytic aluminum foil, an electrode for an
(Continued)

electrical storage device, and an electrical storage device. An electrolytic aluminum foil of the present invention as a means for achieving the object is characterized in that both surfaces of the foil have L* values of 86.00 or more in the L*a*b* color space (SCI method). The electrolytic aluminum foil of the present invention can be produced, for example, employing a method for producing an electrolytic aluminum foil, which comprises applying a current between a cathode drum partially immersed in a plating solution and an anode plate immersed in the plating solution to form an aluminum film on the surface of the cathode drum, and then separating, from the cathode drum, the aluminum film raised from the liquid surface by rotating the cathode drum, and in which the dew point of a treatment atmosphere at the time of the separation of the aluminum film from the cathode drum to give an electrolytic aluminum foil is controlled to be −50.0° C. or less.

8 Claims, 7 Drawing Sheets

(51) Int. Cl.
| | | |
|---|---|---|
| *C25D 3/44* | (2006.01) | |
| *H01G 11/68* | (2013.01) | |
| *H01G 11/86* | (2013.01) | |
| *H01M 10/0525* | (2010.01) | |
| *H01G 11/70* | (2013.01) | |
| *H01G 11/84* | (2013.01) | |
| *H01G 9/045* | (2006.01) | |

(52) U.S. Cl.
CPC ............ *H01G 11/70* (2013.01); *H01G 11/84* (2013.01); *H01G 11/86* (2013.01); *H01M 10/0525* (2013.01); *H01G 9/045* (2013.01); *Y02E 60/13* (2013.01); *Y02T 10/7022* (2013.01)

(56) References Cited

U.S. PATENT DOCUMENTS

| 2014/0346050 A1* | 11/2014 | Sakaida | C25D 21/14 |
|---|---|---|---|
| | | | 205/77 |
| 2016/0212836 A1* | 7/2016 | Arai | C25D 1/04 |
| 2016/0218369 A1* | 7/2016 | Matsuda | C25D 1/00 |

FOREIGN PATENT DOCUMENTS

| JP | H01-104791 | 4/1989 |
|---|---|---|
| JP | 2008195990 A | 8/2008 |
| JP | 2012-201961 A1 | 10/2012 |
| JP | 2012-246561 A1 | 12/2012 |
| JP | 2012-251210 A1 | 12/2012 |
| JP | 2014-1460 A1 | 1/2014 |
| WO | WO 2011/001932 A1 | 1/2011 |
| WO | WO 2013/129479 A1 | 9/2013 |

OTHER PUBLICATIONS

International Search Report for International Application No. PCT/JP2015/054696 dated May 26, 2015.
Chinese Office Action for Chinese Patent Application No. 201580001877.5 dated Jan. 29, 2018 (7 Sheets).

* cited by examiner

[Fig. 1]
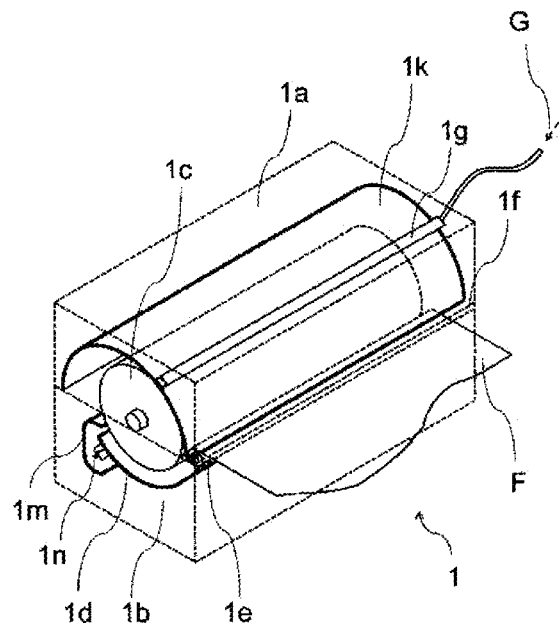
[Fig. 2]
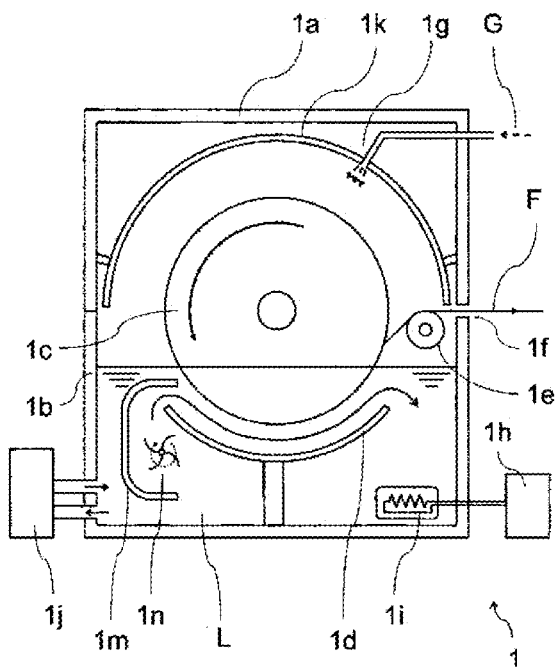

[Fig. 3]
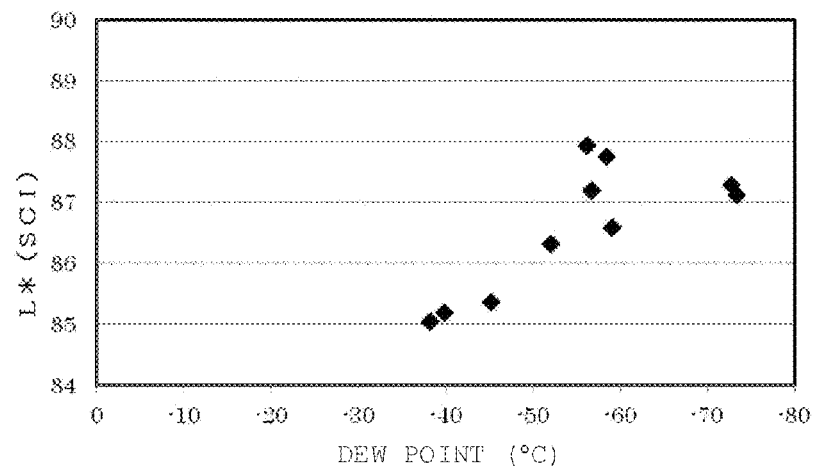
[Fig. 4]
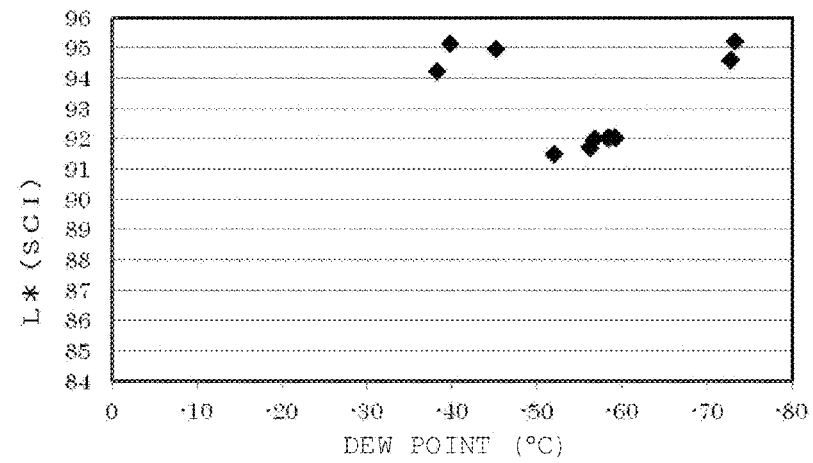

[Fig. 5]
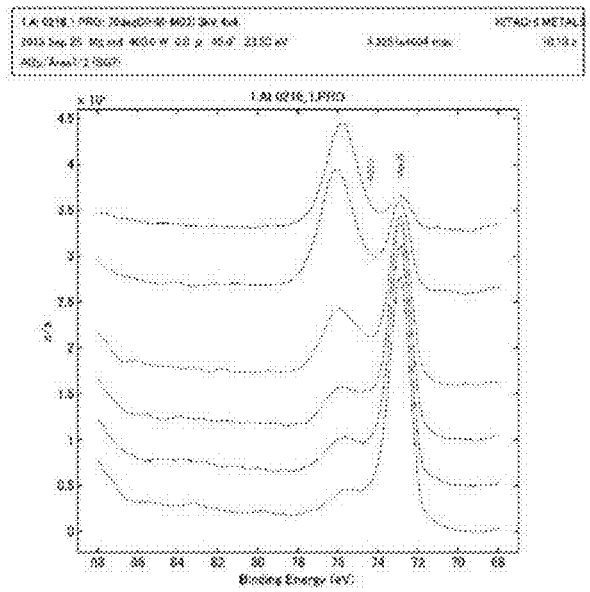
[Fig. 6]
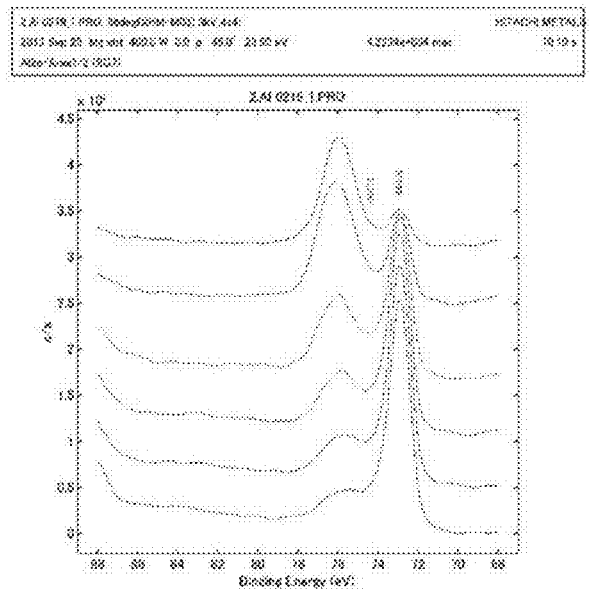

[Fig. 7]
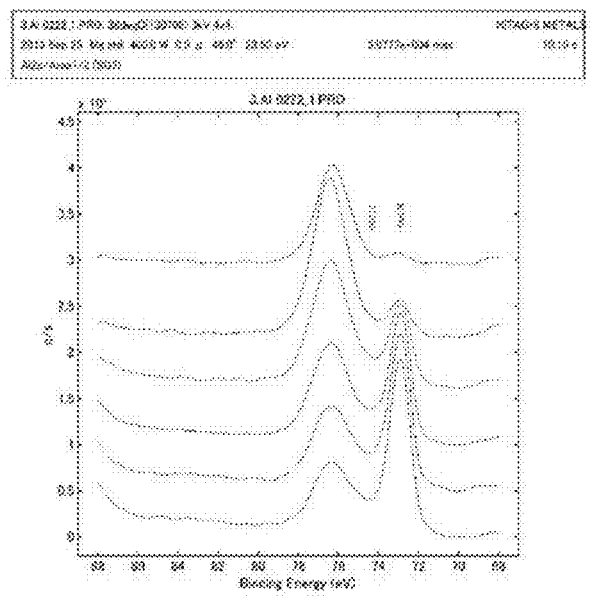
[Fig. 8]
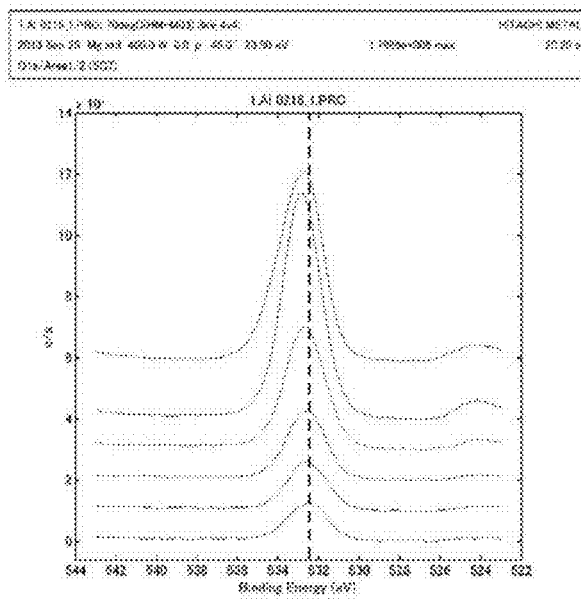

[Fig. 9]
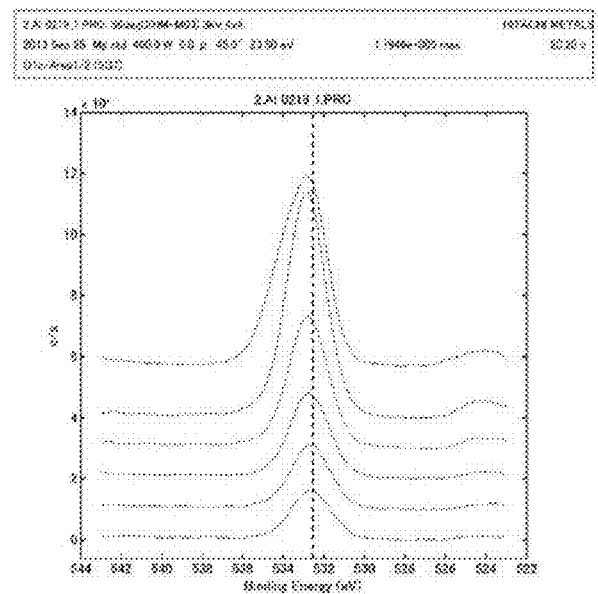
[Fig. 10]
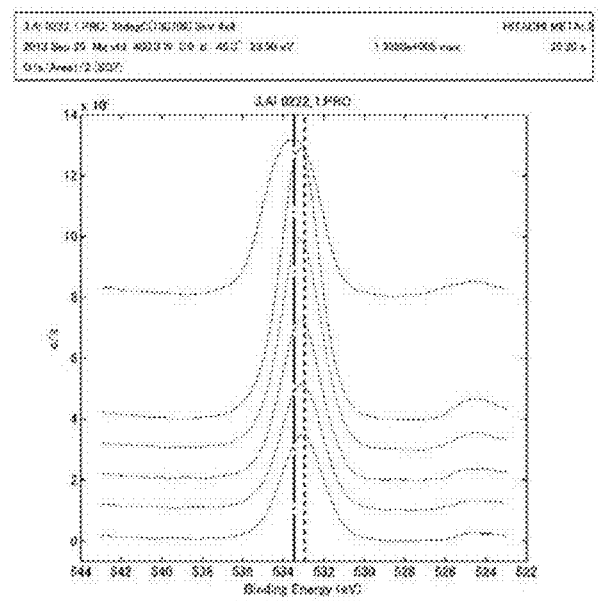

[Fig. 11]
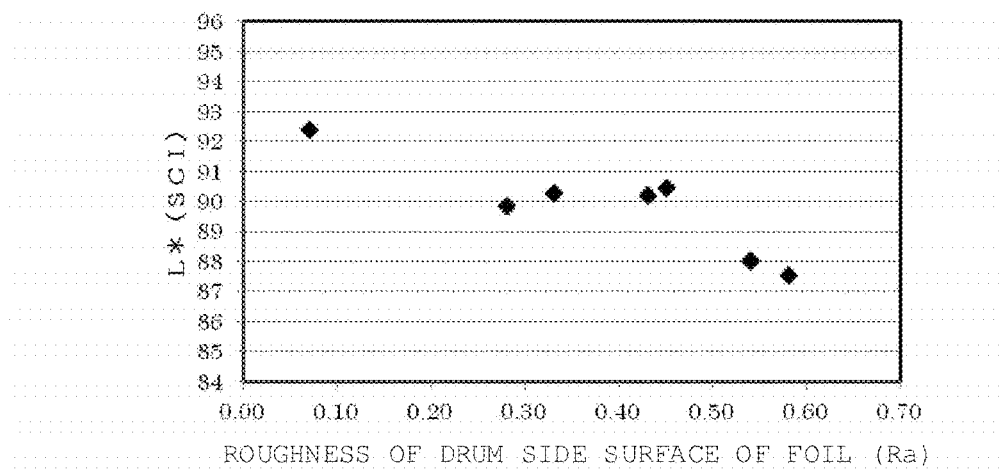
[Fig. 12]
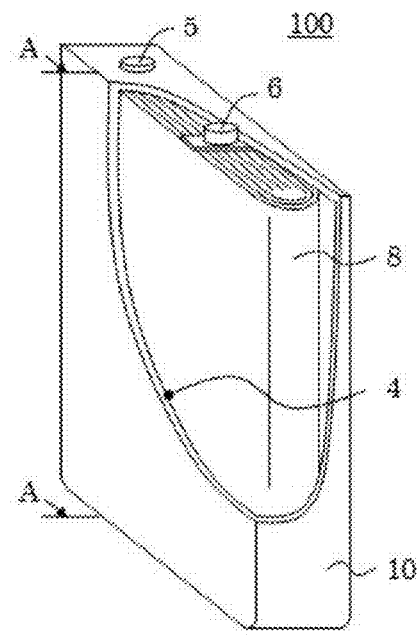

[Fig. 13]
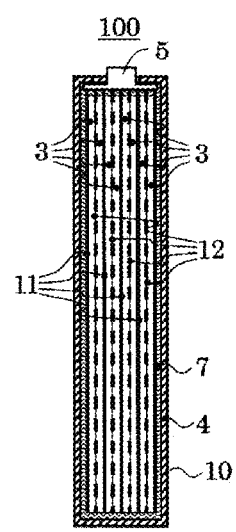

ELECTROLYTIC ALUMINUM FOIL, PRODUCTION METHOD THEREFOR, CURRENT COLLECTOR FOR ELECTRICAL STORAGE DEVICE, ELECTRODE FOR ELECTRICAL STORAGE DEVICE, AND ELECTRICAL STORAGE DEVICE

TECHNICAL FIELD

The present invention relates to an electrolytic aluminum foil which can be used as a positive electrode current collector for an electrical storage device such as a lithium ion secondary battery and a supercapacitor (electrical double-layer capacitor, redox capacitor, lithium ion capacitor, etc.), for example, and also to a method for producing the same. In addition, the present invention also relates to a current collector for an electrical storage device using the electrolytic aluminum foil, an electrode for an electrical storage device, and an electrical storage device.

BACKGROUND ART

It is a well-known fact that lithium ion secondary batteries, which have high energy density and whose discharge capacity does not significantly decrease, have been used as a power source for mobile tools such as mobile phones and laptop computers. In recent years, with the miniaturization of mobile tools, there also is a demand for the miniaturization of lithium ion secondary batteries to be mounted therein. In addition, with the development of hybrid cars, solar power generation, and other technologies as a measure to prevent global warming, etc., new applications of supercapacitors having high energy density, such as electrical double-layer capacitors, redox capacitors, and lithium ion capacitors, have been increasingly expanding, and there is a demand for a further increase in their energy density.

An electrical storage device such as a lithium ion secondary battery or a supercapacitor, has a structure in which, for example, a positive electrode and a negative electrode are arranged via a separator made of polyolefin or the like in an organic electrolytic solution containing a fluorine-containing compound such as $LiPF_6$ or $NR_4 \cdot BF_4$ (R is an alkyl group) as an electrolyte. Generally, the positive electrode includes a positive electrode active material, such as $LiCoO_2$ (lithium cobalt oxide) or active carbon, and a positive electrode current collector, while the negative electrode includes a negative electrode active material, such as graphite or active carbon, and a negative electrode current collector. With respect to their shape, generally, the active material is applied to the surface of the current collector and formed into a sheet. The electrodes are each subjected to high voltage and also immersed in the organic electrolytic solution that contains a fluorine-containing compound, which is highly corrosive. Accordingly, in particular, materials for a positive electrode current collector are required to have excellent electrical conductivity together with excellent corrosion resistance. Under such circumstances, currently, aluminum, which is a good electrical conductor and forms a passive film on the surface to have excellent corrosion resistance, is almost 100% used as a material for a positive electrode current collector. Incidentally, as materials for a negative electrode current collector, copper, nickel, and the like can be mentioned.

One method for providing an electrical storage device with smaller size and higher energy density is to thin a current collector that constitutes a sheet-shaped electrode. Currently, an aluminum foil having a thickness of about 15 to 20 μm produced by rolling is generally used as a positive electrode current collector. Therefore, the object can be achieved by further reducing the thickness of such an aluminum foil. However, with rolling, further reduction of the foil thickness on an industrial production scale is difficult.

Thus, as an aluminum foil production method to replace rolling, a method that produces an aluminum foil by electrolysis, that is, a method that produces an electrolytic aluminum foil, has been attracting attention. In Patent Document 1, the research group of the present inventors has proposed a method for producing an electrolytic aluminum foil, comprising forming an aluminum film on the surface of a substrate by electrolysis using a plating solution containing at least a dialkyl sulfone, an aluminum halide, and a nitrogen-containing compound, and then separating the film from the substrate.

In the case of an industrial-scale electrolytic aluminum foil production, it is preferable that the step of forming an aluminum film on the surface of a substrate and the step of separating the film from the substrate are performed continuously using a cathode drum, rather than batchwise. The production of an electrolytic aluminum foil using a cathode drum comprises, for example, applying a current between a cathode drum partially immersed in a plating solution and an anode plate immersed in the plating solution to form an aluminum film on the surface of the cathode drum, and then separating, from the cathode drum, the aluminum film raised from the liquid surface by rotating the cathode drum. Such production can be performed using an electrolytic aluminum foil production apparatus as described in Patent Document 2. The aluminum film separated from the cathode drum can be, as an electrolytic aluminum foil, washed with water, then dried, and used for various applications.

PRIOR ART DOCUMENTS

Patent Documents

Patent Document 1: WO 2011/001932
Patent Document 2: JP-A-2012-246561

SUMMARY OF THE INVENTION

Problems that the Invention is to Solve

For example, an electrolytic aluminum foil production apparatus described in Patent Document 2 is suitable for an industrial-scale electrolytic aluminum foil production. However, as a result of analyzing the properties of electrolytic aluminum foils produced using such an electrolytic aluminum foil production apparatus, the present inventors have found that in some electrolytic aluminum foils, one surface undergoes partial discoloration into light black, resulting in significant difference in properties from the other surface. When an electrolytic aluminum foil has significant difference in properties between one surface and the other surface thereof, this is undesirable in terms of achieving the stabilization of the discharge/charge efficiency of an electrical storage device using an electrolytic aluminum foil as a current collector, and is also undesirable in terms of the appearance of the foil.

Thus, an object of the present invention is to provide an electrolytic aluminum foil having no significant difference in properties between one surface and the other surface thereof, and also a method for producing the same. Another object of the present invention is to provide a current collector for an electrical storage device using the electrolytic aluminum foil, an electrode for an electrical storage device, and an electrical storage device.

Means for Solving the Problems

The present inventors have examined the cause of the partial discoloration of one surface of an electrolytic aluminum foil produced using a cathode drum. As a result, it has been speculated that after an aluminum film is formed on the surface of a cathode drum, when the aluminum film raised from the liquid surface by rotating the cathode drum is separated from the cathode drum to give an electrolytic aluminum foil, a plating solution adhering to the surface of the foil on the side that has been in contact with the plating solution (the opposite surface to the surface on the side that has been in contact with the cathode drum; hereinafter, the surface on the side that has been in contact with the plating solution is referred to as "plating solution side surface", and the surface on the side that has been in contact with the cathode drum is referred to as "cathode drum side surface") reacts with moisture in the treatment atmosphere, whereby an aluminum oxide film or hydroxide film is formed on the foil surface, and this causes discoloration. Then, with respect to the dew point of the treatment atmosphere at the time of the separation of the aluminum film from the cathode drum to give an electrolytic aluminum foil, they have found that as a result of controlling the dew point to be equal to or less than a predetermined temperature, discoloration that is attributable to the reaction of a plating solution adhering to the plating solution side surface of the foil with moisture in the treatment atmosphere, resulting in the formation of an aluminum oxide film or hydroxide film on the foil surface, is prevented, and an electrolytic aluminum foil having a uniform, white appearance, which has no significant difference in properties between the plating solution side surface and the cathode drum side surface thereof, can be obtained.

An electrolytic aluminum foil of the present invention accomplished based on the above findings is characterized in that both surfaces of the foil have L* values of 86.00 or more in the L*a*b* color space (SCI method).

In the above electrolytic aluminum foil, it is preferable that the difference in L* value between the surfaces is 9.00 or less.

It is preferable that the above electrolytic aluminum foil is produced by separating an aluminum film formed on the surface of a cathode drum by electrolysis in a plating solution from the cathode drum.

In the above electrolytic aluminum foil, it is preferable that the plating solution side surface of the foil has an a* value of 1.00 or less and a b* value of 5.00 or less in the L*a*b* color space (SCI method).

In the above electrolytic aluminum foil, it is preferable that the cathode drum side surface of the foil has a surface roughness Ra of 0.50 μm or more and an L* value of 87.00 to 90.00 in the L*a*b* color space (SCI method).

In the above electrolytic aluminum foil, it is preferable that the cathode-drum-side surface of the foil has an a* value of 1.00 or less and a b* value of 5.00 or less in the L*a*b* color space (SCI method).

In addition, a method for producing an electrolytic aluminum foil of the present invention comprises applying a current between a cathode drum partially immersed in a plating solution and an anode plate immersed in the plating solution to form an aluminum film on the surface of the cathode drum, and then separating, from the cathode drum, the aluminum film raised from the liquid surface by rotating the cathode drum. The method is characterized in that the dew point of a treatment atmosphere at the time of the separation of the aluminum film from the cathode drum to give an electrolytic aluminum foil is controlled to be −50.0° C. or less.

In the above method for producing an electrolytic aluminum foil, it is preferable that the plating solution is a plating solution containing at least a dialkyl sulfone, an aluminum halide, and a nitrogen-containing compound.

In the above method for producing an electrolytic aluminum foil, it is preferable that the nitrogen-containing compound is at least one member selected from the group consisting of an ammonium halide, a hydrogen halide salt of a primary amine, a hydrogen halide salt of a secondary amine, a hydrogen halide salt of a tertiary amine, a quaternary ammonium salt represented by the general formula: $R^1R^2R^3R^4N \cdot X$ ($R^1$ to $R^4$ independently represent an alkyl group and are the same as or different from one another, and X represents a counteranion for the quaternary ammonium cation), and a nitrogen-containing aromatic compound.

In addition, a current collector for an electrical storage device of the present invention is characterized by comprising the above electrolytic aluminum foil.

In addition, an electrode for an electrical storage device of the present invention is characterized by comprising an electrode active material supported on the above electrolytic aluminum foil.

In addition, an electrical storage device of the present invention is characterized by being configured using the above electrode for an electrical storage device.

Effect of the Invention

The present invention makes it possible to provide an electrolytic aluminum foil having no significant difference in properties between one surface and the other surface thereof, and also a method for producing the same. In addition, the present invention also makes it possible to provide a current collector for an electrical storage device using the electrolytic aluminum foil, an electrode for an electrical storage device, and an electrical storage device.

BRIEF DESCRIPTION OF THE DRAWINGS

FIG. 1 is a perspective view schematically showing the internal structure of an example of an apparatus that can be used to produce an electrolytic aluminum foil of the present invention.

Similarly, FIG. 2 is a front view schematically showing the internal structure.

FIG. 3 is a graph showing the relation between the dew point of the treatment atmosphere during the production of an electrolytic aluminum foil and the L* value of the plating solution side surface of the foil in Experiment 1 of Examples.

Similarly, FIG. 4 is a graph showing the relation between the dew point of the treatment atmosphere during the production of an electrolytic aluminum foil and the L* value of the cathode drum side surface of the foil.

FIG. 5 shows the Al2p spectra of the plating solution side surface of an electrolytic aluminum foil of the present invention in Experiment 2 of Examples (No. 1).

Similarly, FIG. 6 shows the Al2p spectra of the plating solution side surface of an electrolytic aluminum foil of the present invention (No. 2).

Similarly, FIG. 7 shows the Al2p spectra of the plating solution side surface of an electrolytic aluminum foil of the comparative example.

Similarly, FIG. 8 shows the O1s spectra of the plating solution side surface of an electrolytic aluminum foil of the present invention (No. 1).

Similarly, FIG. 9 shows the O1s spectra of the plating solution side surface of an electrolytic aluminum foil of the present invention (No. 2).

Similarly, FIG. 10 shows the O1s spectra of the plating solution side surface of an electrolytic aluminum foil of the comparative example.

FIG. 11 is a graph showing the relation between the surface roughness Ra and the L* value of the cathode drum side surface of each electrolytic aluminum foil in Experiment 3 of Examples.

FIG. 12 is a schematic view of an example of an electrical storage device using an electrolytic aluminum foil of the present invention as a positive electrode current collector for an electrical storage device in Application Example 1 of Examples.

FIG. 13 is an A-A cross-section of FIG. 12.

MODE FOR CARRYING OUT THE INVENTION

An electrolytic aluminum foil of the present invention is characterized in that both surfaces of the foil have L* values of 86.00 or more in the L*a*b* color space (SCI method).

The electrolytic aluminum foil of the present invention can be produced, for example, by a method in which an aluminum film formed on the surface of a cathode drum by electrolysis in a plating solution is separated from the cathode drum. Specifically, it can be produced, using an electrolytic aluminum foil production apparatus described in Patent Document 2 or the like, by applying a current between a cathode drum partially immersed in a plating solution and an anode plate immersed in the plating solution to form an aluminum film on the surface of the cathode drum, and then separating, from the cathode drum, the aluminum film raised from the liquid surface by rotating the cathode drum.

FIG. 1 is a perspective view schematically showing the internal structure of an electrolytic aluminum foil production apparatus described in Patent Document 2. Similarly, FIG. 2 is a front view schematically showing the internal structure. This electrolytic aluminum foil production apparatus 1 includes a lid portion 1a, an electrolytic tank 1b, a cathode drum 1c, an anode plate 1d, a guide roll 1e, a foil outlet port 1f, a gas supply port 1g, a heater power supply 1h, a heater 1i, a plating solution circulation system 1j, a ceiling portion 1k, a stirring flow guide 1m, a stirring blade 1n, and a non-illustrated direct-current power supply. The cathode drum 1c is made of a metal such as stainless steel, titanium, aluminum, nickel, or copper, and disposed to be partially immersed in a plating solution L stored in the electrolytic tank 1b. The anode plate 1d is made of aluminum, for example, and disposed in the plating solution L to face the surface of the cathode drum 1c (it is preferable that the purity of aluminum is 99.0% or more). The cathode drum 1c and the anode plate 1d are connected to the direct-current power supply. While energizing the two, the cathode drum 1c is rotated at a constant speed (the speed depends on the desired thickness of the electrolytic aluminum foil, the temperature of the plating solution, the applied current density, etc., but is 6 to 20 rad/h, e.g.), whereby an aluminum film is formed on the surface of the cathode drum 1c immersed in the plating solution L. During energization, the plating solution L is heated to and maintained at a predetermined temperature by the heater 1i connected to the heater power supply 1h. At the same time, the plating solution L is stirred by the rotation of the stirring blade 1n, and a homogeneous flow of the plating solution L is generated between the cathode drum 1c and the anode plate 1d by the stirring flow guide 1m, whereby a homogeneous aluminum film can be formed on the surface of the cathode drum 1c. When the cathode drum 1c is further rotated, the aluminum film formed on the surface of the cathode drum 1c is raised from the liquid surface, and also a new aluminum film is formed on the surface of the cathode drum 1c newly immersed in the plating solution L. The aluminum film raised from the liquid surface is guided at the end portion thereof to the guide roll 1e and separated from the cathode drum 1c. The film is thus pulled outside the apparatus from the foil outlet port 1f provided in the side surface of the apparatus, as an electrolytic aluminum foil F. In this manner, the formation of an aluminum film on the surface of the cathode drum 1c and the separation of the film from the cathode drum 1c are continuously performed, and the electrolytic aluminum foil F pulled outside the apparatus is immediately washed with water to remove a plating solution adhering to the surface thereof and then dried, and thus can be used for various applications.

In the case of using an electrolytic aluminum foil production apparatus described in Patent Document 2, the electrolytic aluminum foil of the present invention can be produced by supplying a gas G having a dew point of −50.0° C. or less as a treatment atmosphere control gas from the gas supply port 1g into the apparatus at a supply rate of 1 to 50 L/min, for example, to control the dew point of the treatment atmosphere to be −50.0° C. or less. As a result of controlling the dew point of the treatment atmosphere to be −50.0° C. or less, when the aluminum film raised from the liquid surface is separated from the cathode drum 1c to obtain the electrolytic aluminum foil F, discoloration that is attributable to the reaction of a plating solution adhering to the surface of the foil on the side that has been in contact with the plating solution L (in FIG. 2, the lower surface) with moisture in the treatment atmosphere, resulting in the formation of an aluminum oxide film or hydroxide film on the foil surface, is prevented. The gas G having a dew point of −50.0° C. or less to be supplied into the apparatus as a treatment atmosphere control gas is not particularly limited in kind as long as the gas has a dew point of −50.0° C. or less. However, it is preferable that the kind of the gas is an inert gas, such as argon gas or nitrogen gas. In terms of the ease of preparing the treatment atmosphere control gas, etc., the lower limit of the dew point of the treatment atmosphere is −80.0° C., for example.

In the electrolytic aluminum foil of the present invention, discoloration that is attributable to the reaction of a plating solution adhering to the plating solution side surface of the foil with moisture in the treatment atmosphere, resulting in the formation of an aluminum oxide film or hydroxide film on the foil surface, is prevented. As a result, in the L*a*b* color space (SCI method), the L* value of the plating solution side surface of the foil is 86.00 or more, while the L* value of the cathode drum side surface of the foil (surface no plating solution having adhering thereto) is similarly 86.00 or more. Thus, the foil has a uniform, white appearance on both sides. Here, an L* value in the L*a*b* color space indicates lightness and is a numerical value within a range of 0 (black) to 100 (white). The L* value of the plating solution side surface of the electrolytic aluminum foil of the present invention is about 86.00 to 88.00. Meanwhile, the L* value of the cathode drum side surface of the foil depends on the surface roughness Ra of the cathode drum side surface of the foil, which reflects the surface roughness Ra of the cathode drum, but is about 87.00 to 96.00. In order to use an electrolytic aluminum foil of the present invention without distinction between front and back, it is preferable that the difference between the L* value of the plating solution side surface and the L* value of the cathode drum side surface of the foil is 9.00 or less, more preferably 7.00 or less, and further preferably 5.00 or less. For example, in the case where an electrolytic aluminum foil is produced using a cathode drum having a surface roughness Ra of 0.50 to 0.60 µm, the L* value of the cathode drum side surface of such a foil is about 87.00 to 90.00 (the surface roughness Ra reflects the surface roughness Ra of the cathode drum), which is similar to the L* value of the plating solution side surface. In addition, it is preferable that in the L*a*b* color space (SCI method), both the plating solution side surface and the cathode drum side surface of the electrolytic aluminum foil of the present invention have an a* value of 1.00 or less and a b* value of 5.00 or less. In the L*a*b* color space, with respect to the a* value, the +side is the direction of red, and the −side is the direction of green. With respect to the b* value, the +side is the direction of yellow, and the −side is the direction of blue. Incidentally, measurement methods for the L*a*b* color space include the SCI method, in which light is measured including specularly reflected light, and the SCE method, in which specularly reflected light is removed, and only diffusely reflected light is measured. In the present invention, the SCI method, according to which, regardless of the surface conditions of the object to be measured, the color of the material itself can be evaluated, is employed.

It is preferable that the aluminum content of the electrolytic aluminum foil of the present invention is 98.00 mass % or more. A high aluminum content leads to low volume resistivity, which is advantageous in that when the foil is used as a current collector for an electrical storage device, the electrical storage efficiency of the electrical storage device can be increased, and also advantageous in that because the heat dissipation is improved, the foil can be used for applications where excellent heat dissipation is required. In addition, a high aluminum content also leads to high ductility, which is advantageous in that the aluminum film is less likely to break when separated from a cathode drum. The aluminum content of the electrolytic aluminum foil of the present invention is more preferably 99.00 mass % or more. The upper limit thereof is 99.90 mass % in many cases, but both the plating solution side surface and the cathode drum side surface of the foil have a uniform, white appearance, as mentioned above. Incidentally, the thickness of the electrolytic aluminum foil of the present invention is 1 to 20 µm, for example.

A plating solution used to produce the electrolytic aluminum foil of the present invention is not particularly limited as long as it can be used to produce an aluminum foil by electrolysis. However, a plating solution containing at least a dialkyl sulfone, an aluminum halide, and a nitrogen-containing compound proposed in Patent Document 1 by the research group of the present inventors is preferable in that a high-ductility, high-purity electrolytic aluminum foil can be produced at a high film formation rate.

Examples of the dialkyl sulfone include those having a $C_{1-6}$ alkyl group (straight or branched), such as dimethyl sulfone, diethyl sulfone, dipropyl sulfone, dihexyl sulfone, and methylethyl sulfone. In terms of excellent electrical conductivity, availability, and the like, it is preferable to employ dimethyl sulfone.

Examples of the aluminum halide include aluminum chloride and aluminum bromide. In terms of minimizing the content of moisture in the plating solution, which serves as a factor that inhibits the deposition of aluminum, it is preferable that the aluminum halide used is an anhydride.

It is preferable that the nitrogen-containing compound is at least one member selected from the group consisting of an ammonium halide, a hydrogen halide salt of a primary amine, a hydrogen halide salt of a secondary amine, a hydrogen halide salt of a tertiary amine, a quaternary ammonium salt represented by the general formula: $R^1R^2R^3R^4N.X$ ($R^1$ to $R^4$ independently represent an alkyl group and are the same as or different form one another, and X represents a counteranion for the quaternary ammonium cation), and a nitrogen-containing aromatic compound. The nitrogen-containing compound may be a single kind, and it is also possible to use a mixture of two or more kinds. Examples of the ammonium halide include ammonium chloride and ammonium bromide. In addition, examples of the primary to tertiary amines include those having a $C_{1-6}$ alkyl group (straight or branched), such as methylamine, dimethylamine, trimethylamine, ethylamine, diethylamine, triethylamine, propylamine, dipropylamine, tripropylamine, hexylamine, and methylethylamine. Examples of the hydrogen halide include hydrogen chloride and hydrogen bromide. In the quaternary ammonium salt represented by the general formula: $R^1R^2R^3R^4N.X$ ($R^1$ to $R^4$ independently represent an alkyl group and are the same as or different from one another, and X represents a counteranion for the quaternary ammonium cation), examples of the alkyl group represented by $R^1$ to $R^4$ include $C_{1-6}$ alkyl groups (straight or branched) such as a methyl group, an ethyl group, a propyl group, and a hexyl group. Examples of X include halide ions such as a chlorine ion, a bromine ion, and an iodine ion, as well as $BF_4^-$, $PF_6^-$, and the like. Specific examples of the compound include tetramethylammonium chloride, tetramethylammonium bromide, tetramethylammonium iodide, and tetraethylammonium tetrafluoroborate. Examples of the nitrogen-containing aromatic compound include phenanthroline and aniline. In terms of facilitating the production of a high-ductility, high-purity electrolytic aluminum foil at a high film formation rate, preferred examples of the nitrogen-containing compound include hydrochlorides of tertiary amines, such as trimethylamine hydrochloride.

With respect to the blending ratio of a dialkyl sulfone, an aluminum halide, and a nitrogen-containing compound, for example, per 10 mol of the dialkyl sulfone, it is preferable that the amount of the aluminum halide is 1.5 to 6.0 mol, more preferably 2.0 to 5.0 mol, and further preferably 2.5 to 4.0 mol. It is preferable that the amount of the nitrogen-containing compound is 0.001 to 2.0 mol, more preferably 0.005 to 0.2 mol, and further preferably 0.01 to 0.1 mol. When the amount of the aluminum halide blended is less than 1.5 mol per 10 mol of the dialkyl sulfone, this may cause the darkening of the formed aluminum film (a phenomenon called burning) or reduce the film formation efficiency. Meanwhile, when it is more than 6.0 mol, the solution resistance of the resulting plating solution may be so high that the plating solution generates heat and decomposes. In addition, when the amount of the nitrogen-containing compound blended is less than 0.001 mol per 10 mol of the dialkyl sulfone, it may be difficult to obtain the effects of blending, that is, effects including the improvement of the film formation rate owing to the achievement of a plating treatment at a higher applied current density based on the improved electrical conductivity of the plating solution, the purity increase or the ductility improvement in the electrolytic aluminum foil, etc. Further, as a result of the increased incorporation of impurities such as carbon, sulfur, and chlorine, particularly carbon, into the electrolytic aluminum foil, the purity may decrease. Meanwhile, when it is more than 2.0 mol, due to an essential change in the composition of the plating solution, aluminum may not be deposited. It is preferable that the dialkyl sulfone, the aluminum halide, and the nitrogen-containing compound are mixed in a predetermined blending ratio in an inert gas atmosphere, such as argon gas or nitrogen gas, and then heated to the melting point of the dialkyl sulfone (about 110° C. in the case of dimethyl sulfone), and the aluminum halide and the nitrogen-containing compound are dissolved in the dissolved dialkyl sulfone, thereby preparing a plating solution.

As the plating conditions, for example, the temperature of the plating solution may be 60 to 150° C., and the applied current density may be 0.25 to 20 A/dm$^2$. The lower limit of the temperature of the plating solution should be determined in consideration of the melting point of the plating solution, and is preferably 80° C., and more preferably 95° C. (when the temperature is below the melting point of the plating solution, the plating solution solidifies, making it impossible to perform a plating treatment). Meanwhile, when the temperature of the plating solution is more than 150° C., this may accelerate the reaction between the aluminum film formed on the surface of the cathode drum and the plating solution, which increases the incorporation of impurities, such as carbon, sulfur, and chlorine, into the electrolytic aluminum foil, resulting in reduced purity. It is preferable that the upper limit of the temperature of the plating solution is 125° C., more preferably 115° C., and further preferably 110° C. In addition, when the applied current density is less than 0.25 A/dm$^2$, the film formation efficiency may decrease. Meanwhile, when it is more than 20 A/dm$^2$, because of the decomposition of the nitrogen-containing compound, etc., it may be impossible to perform a stable plating treatment or obtain a high-ductility, high-purity electrolytic aluminum foil, or the surface roughness Ra of the plating solution side surface of the electrolytic aluminum foil may be too high (e.g., 0.6 µm or more). It is preferable that the applied current density is 5 to 17 A/dm$^2$, more preferably 10 to 15 A/dm$^2$.

Incidentally, in the electrolytic aluminum foil of the present invention, it is preferable that the elastic modulus is smaller in both surface regions than in the center region in the thickness direction of the foil, and the difference in elastic modulus between the center region and each surface region of the foil as measured by a nanoindentation method is 8.0 GPa or less. This is because such an electrolytic aluminum foil has excellent flexibility so that winding-up is not hindered by bending or twisting of the foil. When the elastic modulus is smaller in both surface regions than in the center region in the thickness direction of the foil, this means that the elongation is greater in both surface regions than in the center region in the thickness direction of the foil, resulting in excellent flexibility. When the difference in elastic modulus between the center region and each surface region of the foil as measured by a nanoindentation method is more than 8.0 GPa, the difference in elastic modulus is too much, and this adversely affects the flexibility of the foil.

EXAMPLES

Hereinafter, the present invention will be described in detail with reference to the examples. However, the present invention should not be construed as being limited to the following descriptions.

Experiment 1

Electrolytic Aluminum Foil Production and Property Evaluation

In a nitrogen gas atmosphere, dimethyl sulfone, anhydrous aluminum chloride, and trimethylamine hydrochloride were blended in a molar ratio of 10:3.8:0.05 and dissolved at 110° C. to prepare an electrolytic aluminum plating solution. Using an electrolytic aluminum foil production apparatus described in Patent Document 2 shown in FIGS. 1 and 2 (cathode drum: diameter: 140 mm×width: 200 mm, made of titanium, surface roughness Ra: 0.07 µm; anode plate: made of purity 99.0% aluminum), while rotating the cathode drum at a rotational speed of 15 rad/h, an aluminum film was formed on the surface thereof under plating conditions where the temperature of the plating solution was 100° C. and the applied current density was 10 A/dm$^2$. Subsequently, the aluminum film raised from the liquid surface was separated from the cathode drum to give an electrolytic aluminum foil (guide roll height: 45 mm from the liquid surface of the plating solution). At this time, nitrogen gases having various dew points were each supplied at a supply rate of 30 L/min into the apparatus to control the treatment atmosphere. The electrolytic aluminum foil pulled outside the apparatus was immediately sprayed with water on both sides for primary washing in order to remove a plating solution adhering to the foil surface, then immersed in a water tank for secondary washing, and dried to give an electrolytic aluminum foil with length: 400 mm×width: 200 mm×thickness: 12 µm.

With respect to each of the electrolytic aluminum foils produced in the various treatment atmospheres, the L* values, the a* values, and the b* values of the surfaces of the foil in the L*a*b* color space were measured, and also the appearance was observed. In addition, the aluminum content of the foil was measured. Incidentally, for the measurement of the L* values, the a* values, and the b* values of the foil surfaces, the SCI method was employed. Spectrocolorimeter CM-700d manufactured by KONICA MINOLTA, Inc. was equipped with a white calibration cap to perform white calibration, and then measurement was performed in a dark room using the attached φ8 mm target mask equipped with a stabilizer (CM-A179). With respect to the aluminum content of the foil, the contents of carbon and sulfur in the foil were measured using Carbon/Sulfur Analyzer EMIA-820W manufactured by Horiba Ltd., while the content of chlorine in the foil was measured using Wavelength Dispersive X-Ray Fluorescence Spectrometer RIX-2100 manufactured by Rigaku Corporation, and the remainder was taken as the aluminum content. Table 1 shows the L* values, the a* values, the b* values, and the appearances of the plating solution side surface and the cathode drum side surface of each foil, and also the aluminum content of each foil. In addition, FIG. 3 shows the relation between the dew point of the treatment atmosphere during the production of a foil and the L* value of the plating solution side surface of the foil, while FIG. 4 shows the relation between the dew point of the treatment atmosphere and the L* value of the cathode drum side surface of the foil.

TABLE 1

| Sample No. | Dew Point of Treatment Atmosphere (° C.) | Plating Solution Side Surface of Foil | | | | Cathode Drum Side Surface of Foil | |
|---|---|---|---|---|---|---|---|
| | | L* Value | a* Value | b* Value | Appearance | L* Value | a* Value |
| 1 | −73.3 | 87.11 | −0.31 | 1.80 | Uniform while | 95.22 | −0.04 |
| 2 | −72.7 | 87.28 | −0.17 | 2.23 | Uniform while | 94.60 | 0.03 |
| 3 | −59.1 | 86.58 | −0.48 | 1.06 | Uniform while | 92.04 | 0.00 |
| 4 | −58.4 | 87.76 | −0.36 | 1.55 | Uniform while | 92.04 | 0.02 |
| 5 | −56.7 | 87.19 | −0.49 | 0.87 | Uniform while | 91.99 | −0.01 |
| 6 | −56.2 | 87.93 | −0.46 | 0.93 | Uniform while | 91.70 | −0.01 |
| 7 | −52.0 | 86.31 | −0.40 | 1.36 | Uniform while | 91.50 | −0.01 |
| 8 | −45.2 | 85.36 | −0.29 | 2.00 | Discolored | 94.96 | −0.03 |
| 9 | −39.8 | 85.19 | −0.31 | 2.26 | Discolored | 95.15 | −0.04 |
| 10 | −38.2 | 85.04 | −0.30 | 2.14 | Discolored | 94.23 | 0.01 |

| Sample No. | Cathode Drum Side Surface of Foil | | Difference in L* Value | Al Content (mass %) | Rating |
|---|---|---|---|---|---|
| | b* Value | Appearance | | | |
| 1 | 0.28 | Uniform while | 8.11 | 99.89 | Present Invention |
| 2 | 0.66 | Uniform while | 7.32 | 99.88 | Present Invention |
| 3 | 0.72 | Uniform while | 5.46 | 99.85 | Present Invention |
| 4 | 0.81 | Uniform while | 4.28 | 99.89 | Present Invention |
| 5 | 0.76 | Uniform while | 4.80 | 99.88 | Present Invention |
| 6 | 0.67 | Uniform while | 3.77 | 99.89 | Present Invention |
| 7 | 0.55 | Uniform while | 5.19 | 99.87 | Present Invention |
| 8 | 0.26 | Uniform while | 9.60 | 99.95 | Comparative Example |
| 9 | 0.43 | Uniform while | 9.96 | 99.94 | Comparative Example |
| 10 | 0.42 | Uniform while | 9.19 | 99.91 | Comparative Example |

As is clear from Table 1, and FIGS. 3 and 4, there was correlation between the L* value of the plating solution side surface of the electrolytic aluminum foil and the dew point of the treatment atmosphere during the production of the foil, and the lower the dew point temperature, the greater the L* value. As a result of controlling the dew point to be −50.0° C. or less, the L* value became 86.00 or more, resulting in a uniform, white appearance. In contrast, when the dew point was more than −50.0° C., the L* value of the plating solution side surface of an electrolytic aluminum foil was less than 86.00, and partial discoloration into light black was observed in the appearance. In the electrolytic aluminum foils produced in the treatment atmosphere having a dew point controlled to be −50.0° C. or less, the aluminum content was 99.90 mass % or less. It was surprising that, as compared with the foils produced in the treatment atmosphere having a dew point of more than −50.0° C., although the aluminum content was lower, the L* value of the plating solution side surface of the foil was greater. Meanwhile, there was no correlation between the L* value of the cathode drum side surface of the electrolytic aluminum foil and the dew point of the treatment atmosphere during the production of the foil. At any dew point, the L* value was 90.00 or more, resulting in a uniform, white appearance. In the electrolytic aluminum foils produced in the treatment atmosphere having a dew point controlled to be −50.0° C. or less, the difference between the L* value of the plating solution side surface and the L* value of the cathode drum side surface was 9.00 or less, which is smaller than the difference between the L* value of the plating solution side surface and the L* value of the cathode drum side surface in the case of the foils produced in the treatment atmosphere having a dew point of more than −50.0° C. Incidentally, in all the electrolytic aluminum foils, the plating solution side surface of the foil had an a* value of 0.00 or less and a b* value of 3.00 or less, and the cathode drum side surface of the foil had an a* value of 1.00 or less and a b* value of 1.00 or less.

In addition, the elastic modulus of each electrolytic aluminum foil was measured using Triboindenter manufactured by Hysitron Inc., as an analyzer (nanoindenter) under the following conditions. As a result, in all the foils, the elastic modulus was smaller in both surface regions than in the center region in the thickness direction of the foil, and the difference in elastic modulus between the center region and each surface region of the foil was 8.0 GPa or less. The electrolytic aluminum foils were each subjected to a 180° bending test, in which a foil having a length of 50 mm is bent at 180° to bring both ends into contact with each other, and the occurrence of breakage is visually observed. As a result, all the foils had excellent flexibility. Even when the fold was pressed after 180° bending, no breakage occurred.

(Conditions for Measurement of Elastic Modulus of Electrolytic Aluminum Foil)

Indenter used: Berkovich (triangular pyramid shape)
Measurement method: Single indentation measurement
Temperature: Room temperature (25° C.)
Indentation depth setting: 100 nm
Measurement position: Points 2μm in the depth direction from the respective surface regions (the plating solution side surface (front surface region) and the cathode drum side surface (back surface region)) and a center region; three points in total In addition, electrolytic aluminum foils were produced using, as plating solutions different from the above plating solution, plating solutions prepared from dimethyl sulfone, anhydrous aluminum chloride, and trimethylamine hydrochloride blended at various ratios using 2.0 to 5.0 mol of anhydrous aluminum chloride and 0.005 to 0.2 mol of trimethylamine hydrochloride per 10 mol of dimethyl sulfone, and also plating solutions prepared by blending various nitrogen-containing compounds different from trimethylamine hydrochloride. Also in such cases, there was correlation between the L* value of the plating solution side surface of each foil and the dew point of the treatment atmosphere during the production of the foil. As a result of controlling the dew point to be −50.0° C. or less, the L* value became 86.00 or more, resulting in a uniform, white appearance.

Experiment 2

X-Ray Photoelectron Spectrometry Analysis of Electrolytic Aluminum Foil

With respect to each of the electrolytic aluminum foils of Sample No. 1 of the present invention, Sample No. 7 of the present invention, and Sample No. 10 of the comparative example obtained in Experiment 1, the properties of the plating solution side surface thereof (in the electrolytic aluminum foil of Sample No. 10, the light-black discolored part) were examined by X-ray photoelectron spectroscopy (XPS) analysis (apparatus: ESCA-5400R manufactured by ULVAC-PHI, Inc.). Incidentally, as the X-ray source, MgKα ray (15.0 kV, 26.7 mA (400 W)) was used. The takeoff angle was 45°. The analysis area was 800 μm φ. The sputtering conditions (Ar$^+$) were as follows; accelerating voltage: 3 kV, raster size: 4×4 mm, and sputtering rate: 2.5 nm/min (in terms of $SiO_2$). The Al2p spectra (68 to 88 eV) of the plating solution side surfaces of the foils of Sample No. 1 of the present invention, Sample No. 7 of the present invention, and Sample No. 10 of the comparative example are shown in FIGS. 5, 6, and 7, respectively. Incidentally, in each figure, the measurement result at the top indicates the measurement result of the surface of the foil, and the measurement results successively indicate the measurement results of deeper points reached by sputtering. A peak near 73 eV shows the presence of metallic aluminum, and a peak near 76 eV shows the presence of aluminum oxide or hydroxide. The peak intensity indicates the degree of presence. As is clear from FIGS. 5, 6, and 7, in each foil, the presence of aluminum oxide or hydroxide was observed in the surface. However, in the foils of Sample Nos. 1 and 7 of the present invention, the presence of metallic aluminum was observed at the same time. In contrast, in the foil of Sample No. 10 of the comparative example, the presence of metallic aluminum was hardly observed. Comparing the third measurement results from the top, in the foils of Sample Nos. 1 and 7 of the present invention, the peak intensity of metallic aluminum was higher than that of aluminum oxide or hydroxide, while in the foil of Sample No. 10 of the comparative example, the peak intensity of aluminum oxide or hydroxide was higher than that of metallic aluminum.

In addition, the O1s spectra (523 to 543 eV) of the plating solution side surfaces of the electrolytic aluminum foils of Sample No. 1 of the present invention, Sample No. 7 of the present invention, and Sample No. 10 of the comparative example are shown in FIGS. 8, 9, and 10, respectively. Incidentally, in each figure, the measurement result at the top indicates the measurement result of the surface of the foil, and the measurement results successively indicate the measurement results of deeper points reached by sputtering. A peak near 532.3 eV shows the presence of aluminum oxide, and a peak near 532.8 eV shows the presence of aluminum hydroxide. The peak intensity indicates the degree of presence. As is clear from FIGS. 8, 9, and 10, in the foils of Sample Nos. 1 and 7 of the present invention, only the presence of aluminum oxide was observed in the surface. In contrast, in the foil of Sample No. 10 of the comparative example, the presence of aluminum hydroxide was observed in the surface at the same time.

From the above results, it was speculated that the plating solution side surface of the electrolytic aluminum foil of Sample No. 10 of the comparative example was apparently different in properties from the plating solution side surfaces of the electrolytic aluminum foils of Sample Nos. 1 and 7 of the present invention, and also that a thick aluminum oxide film and also an aluminum hydroxide film were formed on the surface, causing the decrease of the L* value and the deterioration of the appearance. In addition, with respect to the formation of such an aluminum oxide film or hydroxide film on the plating solution side surface of the foil, it was speculated that after an aluminum film was formed on the surface of a cathode drum, when the aluminum film raised from the liquid surface by rotating the cathode drum was separated from the cathode drum to give an electrolytic aluminum foil, a plating solution adhering to the plating solution side surface of the foil reacted with moisture in the treatment atmosphere, resulting in such formation. In contrast, it was speculated that in the electrolytic aluminum foils of Sample Nos. 1 and 7 of the present invention, as a result of controlling the dew point of the treatment atmosphere during the production of the foil to be −50.0° C. or less, the reaction of a plating solution adhering to the plating-solution-side surface of the foil with moisture in the treatment atmosphere was suppressed, whereby the formation of an aluminum oxide film or hydroxide film on the foil surface was suppressed.

Experiment 3

Examination of Relation Between Surface Roughness Ra and L* Value of Cathode Drum Side Surface of Electrolytic Aluminum Foil Electrolytic aluminum foils were produced in the same manner as in Experiment 1, except that cathode drums made of titanium with diameter: 140 mm×width: 200 mm having various surface roughnesses Ra were each mounted on an electrolytic aluminum foil production apparatus described in Patent Document 2 shown in FIGS. 1 and 2, and the dew point of the treatment atmosphere was controlled to be −60.0° C. Table 2 and FIG. 11 show the relation between the surface roughness Ra and the L* value of the cathode drum side surface of each obtained electrolytic aluminum foil (Ra reflects the surface roughness Ra of each cathode drum).

TABLE 2

| Cathode Drum Side Surface of Foil | |
|---|---|
| Surface Roughness Ra (μm) | L* Value |
| 0.07 | 92.40 |
| 0.28 | 89.85 |
| 0.33 | 90.28 |
| 0.43 | 90.22 |
| 0.45 | 90.47 |
| 0.54 | 88.02 |
| 0.58 | 87.53 |

As is clear from Table 2 and FIG. 11, correlation was seen between the L* value of the cathode drum side surface of the electrolytic aluminum foil and the surface roughness Ra thereof, and the lower the surface roughness Ra, the greater the L* value. In addition, it turned out that in the case where the surface roughness Ra of the cathode drum side surface of the electrolytic aluminum foil is 0.50 to 0.60 μm, that is, in the case where an electrolytic aluminum foil is produced using a cathode drum having a surface roughness Ra of 0.50 to 0.60 μm, the L* value of the cathode drum side surface of the obtained electrolytic aluminum foil is about 87.00 to 90.00, which is similar to the L* value of the plating solution side surface.

Application Example 1

Fabrication of Electrical Storage Device using Electrolytic Aluminum Foil of the Present Invention as Positive Electrode Current Collector for Electrical Storage Device Using the electrolytic aluminum foil of Sample No. 1 of the present invention obtained in Experiment 1 as a positive electrode current collector, a positive electrode active material was applied to the surface thereof, and the positive electrode thus obtained was used to fabricate an electrical storage device shown in FIG. 12. The electrical storage device 100 has a structure in which a casing 10 is filled with an organic electrolytic solution 7 containing a fluorine compound, and an electrode unit 8 is immersed in the organic electrolytic solution. The electrode unit 8 has a structure in which a positive electrode, a negative electrode, and a separator, which are strip-shaped thin foils, are stacked in the order of positive electrode/separator/negative electrode/separator into a laminate and wound. The casing 10 is made of a metal material and has an insulating layer 4 formed therein. In addition, the casing 10 is provided with a positive electrode terminal 5 and a negative electrode terminal 6, which serve as connection terminals to an external device. The positive electrode terminal 5 is electrically connected to a positive electrode 11 of the electrode unit 8, and the negative electrode terminal 6 is electrically connected to a negative electrode 12 of the electrode unit 8. FIG. 13 is an A-A cross-section of FIG. 12. The positive electrode 11 and the negative electrode 12 are physically isolated by a separator 3 and thus are not in direct electrical communication with each other. However, the separator 3 is made of a porous material which the organic electrolytic solution 7 can pass through, and thus the positive electrode 11 and the negative electrode 12 are electrically connected via the organic electrolytic solution 7.

INDUSTRIAL APPLICABILITY

The present invention makes it possible to provide an electrolytic aluminum foil having no significant difference in properties between one surface and the other surface thereof, and also a method for producing the same, and is industrially applicable in this respect. The present invention also makes it possible to provide a current collector for an electrical storage device using the electrolytic aluminum foil, an electrode for an electrical storage device, and an electrical storage device, and is industrially applicable in this respect.

EXPLANATION OF REFERENCE NUMERALS

1: Electrolytic aluminum foil production apparatus
1a: Lid portion
1b: Electrolytic tank
1c: Cathode drum
1d: Anode plate
1e: Guide roll
1f: Foil outlet port
1g: Gas supply port
1h: Heater power supply
1i: Heater
1j: Plating solution circulation system
1k: Ceiling portion
1m: Stirring flow guide
1n: Stirring blade
F: Electrolytic aluminum foil
G: Treatment atmosphere control gas
L: Plating solution
3: Separator
4: Insulating layer
5: Positive electrode terminal
6: Negative electrode terminal
7: Organic electrolytic solution
8: Electrode unit
10: Casing
11: Positive electrode
12: Negative electrode
100: Electrical storage device

The invention claimed is:

1. An electrolytic aluminum foil, characterized in that both surfaces of the foil have L* values of 86.00 or more in the L*a*b* color space (SCI method), and
characterized in that the difference in L* value between the surfaces is 9.00 or less.

2. The electrolytic aluminum foil according to claim 1, characterized in that the electrolytic aluminum foil is produced by separating an aluminum film formed on the surface of a cathode drum by electrolysis in a plating solution from the cathode drum.

3. The electrolytic aluminum foil according to claim 2, characterized in that the surface of the foil on the side that has been in contact with the plating solution has an a* value of 1.00 or less and a b* value of 5.00 or less in the L*a*b* color space (SCI method).

4. The electrolytic aluminum foil according to claim 2, characterized in that the surface of the foil on the side that has been in contact with the cathode drum has a surface roughness Ra of 0.50 μm or more and an L* value of 87.00 to 90.00 in the L*a*b* color space (SCI method).

5. The electrolytic aluminum foil according to claim 2, characterized in that the surface of the foil on the side that has been in contact with the cathode drum has an a* value of 1.00 or less and a b* value of 5.00 or less in the L*a*b* color space (SCI method).

6. A current collector for an electrical storage device, characterized by comprising the electrolytic aluminum foil according to claim 1.

7. An electrode for an electrical storage device, characterized by comprising an electrode active material supported on the electrolytic aluminum foil according to claim 1.

8. An electrical storage device, characterized by being configured using the electrode for an electrical storage device according to claim 7.

* * * * *